(12) United States Patent
Saboori

(10) Patent No.: US 9,416,278 B2
(45) Date of Patent: Aug. 16, 2016

(54) PIGMENT DISPERSIONS

(76) Inventor: Farshid Saboori, Bonnyrigg (AU)

( * ) Notice: Subject to any disclaimer, the term of this patent is extended or adjusted under 35 U.S.C. 154(b) by 0 days.

(21) Appl. No.: 14/112,470

(22) PCT Filed: Apr. 19, 2012

(86) PCT No.: PCT/AU2012/000406
§ 371 (c)(1),
(2), (4) Date: Dec. 11, 2013

(87) PCT Pub. No.: WO2012/142665
PCT Pub. Date: Oct. 26, 2012

(65) Prior Publication Data
US 2014/0190370 A1 Jul. 10, 2014

(30) Foreign Application Priority Data
Apr. 19, 2011 (AU) .................. 2011901472

(51) Int. Cl.
*C09D 5/04* (2006.01)
*C09C 3/08* (2006.01)
*C09C 1/32* (2006.01)
*C09C 1/56* (2006.01)

(52) U.S. Cl.
CPC ... *C09C 3/08* (2013.01); *C09C 1/32* (2013.01); *C09C 1/56* (2013.01); *C09D 5/04* (2013.01); *C01P 2004/61* (2013.01)

(58) Field of Classification Search
CPC ............ C09C 1/32; C09C 1/56; C09C 3/08; C09D 5/04
USPC ........................................ 106/499
See application file for complete search history.

(56) References Cited

U.S. PATENT DOCUMENTS

| | | | | |
|---|---|---|---|---|
| 5,897,698 | A * | 4/1999 | Bellas | 106/416 |
| 6,235,217 | B1 | 5/2001 | Turcotte et al. | |
| 6,294,013 | B1 * | 9/2001 | Ortlano et al. | 106/499 |
| 6,896,724 | B2 | 5/2005 | Sun et al. | |
| 7,307,110 | B2 * | 12/2007 | Yatake | 523/160 |
| 2004/0127619 | A1 * | 7/2004 | Sun et al. | 524/385 |
| 2010/0186623 | A1 | 7/2010 | Okabe et al. | |

FOREIGN PATENT DOCUMENTS

| | | |
|---|---|---|
| EP | 0937395 | 5/2003 |
| EP | 1063267 | 6/2003 |
| EP | 1557448 A1 * | 7/2005 |
| GB | 2065692 | 7/1981 |
| GB | 2347937 | 9/2000 |
| JP | 2004002546 | 1/2004 |

* cited by examiner

*Primary Examiner* — Anthony J Green
(74) *Attorney, Agent, or Firm* — David L. Hoffman; Hoffman Patent Group

(57) ABSTRACT

This invention relates to compositions that are dispersions of pigments in the form of premixes that may be used to color a variety of products such as plastics materials, inks and surface coatings and more particularly to compositions that are thixotropic. It also relates to premixes based on water soluble pigments that display Newtonian rheology. The compositions utilise water insoluble pigments having particle sizes that are less then about 10 microns. Both the thixotropic compositions and the Newtonian compositions include water soluble polyols and water. The pH of the premix may be adjusted to be in the range of 4-9 utilising acid or alkali as appropriate.

15 Claims, No Drawings

PIGMENT DISPERSIONS

CROSS-REFERENCE TO RELATED APPLICATIONS

The present application claims priority from Australian patent application 2011901472 the contents of which is incorporated herein by reference.

TECHNICAL FIELD

This invention relates to compositions that are dispersions of pigments in the form of premixes that may be used to colour a variety of products such as plastics materials, inks and surface coatings and more particularly to compositions that in one form, which utilizes water insoluble pigments, are thixotropic and in another form, which uses water soluble pigments, display Newtonian rheology.

BACKGROUND ART

Thixotropy is reversible time-dependent shear thinning of liquids and semi-solids. There are a number of advantages in using thixotropic dispersions in the colouring of materials such as plastics, inks and surface coatings. For example, these dispersions are easier to handle than a Newtonian liquid, because they are less likely to drip or spill. If used directly as a printing ink, for instance, they are less likely to run (flow down or spread laterally) compared with a Newtonian liquid. They resist settling of the pigment during storage. They are easier to dispense than a stiff solid. Finally, when the dispersions are first prepared, entrapped air-bubbles (if present) may be readily removed by vibrating or vertically tapping the sample.

As used in this specification, the term "pigment" refers to colorants, which are either water soluble pigments or water insoluble pigments being substances such as lake dyes, titanium dioxide and carbon black. Typically, such pigments are provided as fine, dry powders which are then incorporated into various products in order to impart colour either to the product itself or in the case of surface coatings or inks, to the surface to which they are applied or printed.

Owing to the fact that pigments are often difficult to disperse in the product to be coloured, it is usual that the pigment is formulated into a premix that may be more readily dispensed and included in the product. This ensures that the product achieves a uniform colour by virtue of the ease with which the premix is incorporated and evenly mixed into the product.

In order to ensure that the greatest depth of colour is achieved in a finished product, it is desirable that the concentration of pigment in a premix is maximised. This also has the added advantage that the level of additives in the premix, other then pigment, is minimised.

However, water insoluble pigments are notoriously difficult to disperse and provide as stable premixes. Efficient and effective pigment dispersion is necessary in order to obtain optimum and consistent colour strength. An effective dispersion process consists of the permanent breaking down of agglomerates into primary particles that are uniformly dispersed in the premix. In general terms, key steps in a dispersion process are:

Deagglomeration in which agglomerates and aggregates are broken down by the shear forces of the equipment being used to form the dispersion. This is followed by wetting out, which occurs at the surface of a pigment when a liquid and/or surfactant adheres to the pigment's surface and acts to displace air and moisture from the surface. The pigment must then be equally dispersed throughout premix. Generally, a lower viscosity tends to lead to a more even pigment distribution. Finally, the premix must be stabilised to prevent the pigment from re-agglomerating. Such stabilisation usually requires that the premix have a higher viscosity.

However, in order to achieve the most effective and efficient incorporation of the premix into the product to be coloured, it is desirable that the viscosity of the premix is minimised. Accordingly it will be evident that there is a conflict between on the one hand the stability of the premix and on the other hand, the efficiency of its incorporation into a product.

The present inventor has recognised this conflict in relation to water insoluble pigments and in the invention described below, seeks to provide a premix composition that is thixotropic in character. Such a composition has the advantage of being relatively high in viscosity when not sheared and hence conferring relative stability. However, once sheared by mixed, the viscosity is sufficiently reduced so that the premix may be effectively and efficiently incorporated into a product to be coloured.

The present inventor has also recognised that by substituting water soluble pigments for water insoluble pigments, it is possible to attain Newtonian rheology in a premix which is desirable in some applications.

DISCLOSURE OF INVENTION

Accordingly, the present invention consists in a thixotropic premix composition comprising a tinctorially effective amount of one or more water insoluble pigments having a particle size of less then about 10 microns, one or more water soluble polyols and water, and optionally, one or more water soluble alcohols, an antifoam, soya lecithin, one or more preservatives and sufficient acid or alkali so that the premix has a pH in the range of from 4 to 9.

The present invention further consists in a coloured product which includes a tinctorially effective amount of a thixotropic premix composition which comprises one or more water insoluble pigments having a particle size of less then about 10 microns, one or more water soluble polyols and water, and optionally, one or more water soluble alcohols, an antifoam, soya lecithin, one or more preservatives and sufficient acid or alkali so that the premix has a pH in the range of from 4 to 9.

In an alternative aspect, the present invention consists in a Newtonian premix composition comprising a tinctorially effective amount of one or more water soluble pigments, one or more water soluble polyols and water, and optionally, one or more water soluble alcohols, an antifoam, soya lecithin, one or more preservatives and sufficient acid or alkali so that the premix has a pH in the range of from 4 to 9.

In an alternative aspect, the present invention still further consists in a coloured product which includes a tinctorially effective amount of a Newtonian premix composition which comprises one or more water soluble pigments, one or more water soluble polyols and water, and optionally, one or more water soluble alcohols, an antifoam and soya lecithin, one or more preservatives and sufficient acid or alkali so that the premix has a pH in the range of from 4 to 9.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The present invention is suitable to use in conjunction with a wide range of pigments including water insoluble pigments such as:
3117 Carmine 6 BN
3158 TP Lithol Rubine BK
Carbon black N330
Degussa Printex
$TiO_2$ Titanium dioxide
1104 Fast Yellow
3157 Vulcan Red LC
1283 Permanent Yellow HR
4421 Phthalocyanine Blue B pigment
4431 Phthalocyanine Blue BS pigment
4311 Pigment Sky Blue B
5319 Fast Green lake pigment
5406 Phthalocyanine Green G pigment
3327 Basic Rhodamine BG Lake pigment
6360 Fast Violet lake pigment
1646 Medium Chrome yellow
570 Iron Oxide Green pigment
545 Iron oxide Brown (light)
D & C Green No 3 lake,
D & C Orange No 4 lake,
D & C Orange No 5 aluminium lake,
D & C Orange No 5 zirconium lake,
D & C Orange No 10 aluminium lake,
D & C Orange No 17 lake,
D & C Red No 4 aluminium lake,
D & C Red No 6 aluminium lake,
D & C Red No 6 barium lake,
D & C Red No 7 lake,
D & C Red No 8 lake,
D & C Red No 9 lake,
D & C Red No 19 lake,
D & C Red No 27 lake,
D & C Red No 30 lake,
D & C Red No 33 lake,
D & C Red No 34 lake,
D & C Red No 36 lake,
D & C Yellow No 5 lake,
D & C Yellow No 6 lake,
D & C Yellow No 7 lake,
D & C Yellow No 10 lake,
FD & C Blue 1 lake,
FD & C Red 3 lake,
FD & C Red 4 lake,
FD & C Yellow 5 lake,
FD & C Yellow 6 lake.

It will of course be appreciated that mixtures of pigments may be used in order to obtain a particular colour.

The water insoluble pigment will have a particle size which is typically less then 10 microns.

Preferably the amount of water insoluble pigment included in the premix will be in the range of 16 to 20 gram for 4 to 6 gram of water soluble polyol and 50 gram water. Of the polyols, glycerol, propylene glycol and ethylene glycol are preferred. These may be used singularly or in mixtures. A preferred mixture is glycerol and propylene glycol in about equal amounts.

In some cases, it may be desirable to include a low molecular weight alcohol such ethanol or isopropanol. The inclusion of up to about 1 gram of alcohol makes it much easier to mix the pigment into the glycerol/water liquid. The alcohol greatly improves wetting of the pigment powder and breaks the foam that tends to form. In the case of DC Red 21 lake it was found that the pigment readily mixed into the glycerol/water liquid when about 0.5 gram of isopropanol was used.

The pH of the thixotropic premix may be adjusted preferably to be from 7 to 9 using an alkali, such as ammonia. Generally, an amount of about 0.5 gram will be required for 16 to 20 gram of water insoluble pigment.

Alternatively, the pH of the thixotropic premix may be adjusted preferably to be from 4 to 6 using an acid, such as citric acid. Generally, an amount of about 0.5 gram will be required for 16 to 20 gram of water insoluble pigment.

Without wishing to be bound by theory, the present inventor believes that to achieve a satisfactory thixotropic premix requires three parameters to be adjusted. These parameters are the amount of pigment, the amount of polyol and the pH. In general terms, increasing the level of polyol leads to higher viscosity. At a level of 16 to 20 grams of pigment in conjunction with 4-6 grams of polyol, non-Newtonian, thixotropic rheology will be obtained in the premix composition. Adjusting the pH to 7-9 results in a lowering of viscosity. Reducing the pH to 4-6, using acids such as citric, sulphonic or acetic acid, results in an increase in viscosity.

In some instances, it is desirable to include one or more additional ingredients in the premix composition. These additional ingredients comprise one or more preservatives, an antifoam and soya lecithin. For guidance, the one or more preservatives may be in an amount of from 0 to 2 gram for 16-20 gram pigment. The soya lecithin may be in an amount of from 0 to 4 gram for 16-20 gram pigment. The antifoam may be in an amount of from 0 to 4 gram for 16-20 grain pigment. As previously mentioned, low molecular weight alcohols such as ethanol and isopropanol are functional antifoams which may be included in the thixotropic premix compositions of the invention.

In the alternative aspect of the invention, the premix composition is Newtonian, non-thixotropic. This is achieved by reducing polyol to 0.8 to 8 grams and providing a level of water soluble pigment in the range of 16-40 grams for 50 gram water. That is, the upper level of water soluble pigment is increased from 20 to 40 grams as compared with the thixotropic compositions of the invention. In this aspect, the viscosity would be increased by the addition of acid such as citric, sulphonic or acetic acid. Again additional ingredients may be included. For guidance, the one or more preservatives may be in an amount of from 0 to 2 gram for 16-20 gram pigment. The soya lecithin may be in an amount of from 0 to 4 gram for 16-20 gram pigment. The antifoam may be in an amount of from 0 to 4 gram for 16-20 gram pigment.

The premix compositions of the invention may be incorporated into a wide range of products, such as plastics materials, including TEFLON®, surface coatings, including paints, inks, food, pharmaceuticals, ceramics, latexes and the like. For guidance this may be achieved by including 2 gram of premix into 100 gram of product.

MODES FOR CARRYING OUT THE INVENTION

In order to better understand the invention, a number of examples will now be described.

In the examples that follow, it is demonstrated that thixotropic dispersions of pigments can be prepared by adding progressively increasing proportions of these pigments to mixtures of glycerol and water.

Pigments Tested

The pigments were supplied by all Colour Supplies Pty Ltd as follows:
Cosmetic Ultramarine Blue LAKE CI.77007
DC Red 21 Lake CI45380:3
FD & C Red 40 Lake
Cosmetic Vegetable Carbon Black Preparation of Samples The desired proportions of glycerol and water are mixed. Generally 50/50 by weight glycerol and water was used. The pigment was added while the mixture was stirred at maximum speed using a Silverson mixer (Silverson Machines Ltd, Waterside, Chesham, Bucks). Any other high speed mixer, such as an Ultraturrax or ball-mill, could be used. As more pigment was added, the appearance of the liquid changed and it took on the appearance of a soft dairy product, such as smooth yoghurt. If the stirrer was stopped and a small quantity of the dispersion removed and then placed back on the surface of the dispersion, it did not blend under gravity and surface tension to form a flat surface, but rather stood out as a somewhat raised area.

In the case of FDC Blue 1 lake it was found that we could produce a formulation similar in proportions by mixing pigment and glycerol and then working in the water. This would probably be true for the other pigments. In fact the compositions could be expressed by a triangular graph; in principle it should be possible to take any two of the three components (that is pigment, water and glycerol) and progressively add the third.

In the case of DC Red 21 lake it was found that it was much easier to mix the pigment into the glycerol/water liquid by adding a small quantity of isopropanol. This greatly improved wetting of the powder and broke the foam that tended to form.

In the case of Carbon Black very high shear is initially necessary for good dispersion, but it leads to rheopexy (reversible, time-dependent shear-thickening). On standing for overnight the rheopectic effects disappeared and thereafter the system became thixotropic. We also observed rheopexy for certain proportions of Ultramarine Blue/water/glycerol where the proportion of water to glycerol was 4:1.

Measurement of Thixotropy

Thixotropy was measured using a Brookfield Viscometer (Brookfield Engineering 11 Commerce Boulevard, Middleboro Mass. 02346 U.S.A.) as follows:

After the sample had been prepared the sample was placed so that the measuring device (spindle) was placed in the composition. The speed was set at the lowest rate (0.3 rpm). The spindle was caused to rotate in the conventional mode (i.e. not in Helipath mode). The dial reading was taken at a fixed point on the scale after each revolution for 10 revolutions. The rotation of the spindle was stopped and the spindle left in situ in the composition for one hour. Then 10 more readings were taken.

The rotation of the spindle was stopped and the spindle left in situ in the composition for two hours. Then 10 more readings were taken.

The rotation of the spindle was stopped and the spindle left in situ in the composition overnight (typically 16 to 18 hours). Then 10 more readings were taken.

Results

The following compositions all showed marked thixotropy:

Ultramarine Blue

| % glycerol | % water | % colour | % IPA | Dial reading Time 0 | Dial reading 1 hour | Dial reading 2 hours | Dial reading Overnight |
|---|---|---|---|---|---|---|---|
| 36 | 36 | 28 | 0 | | | | Not thixotropic |
| 31.5 | 31.5 | 37 | 0 | | | | Thixotropic? |
| 29.5 | 29.5 | 41 | 0 | 7.5/7.5* | 10.5/7.8 | 15.5/8.0 | 19.5/7.6 |
| 31.25 | 18.75 | 50 | 0 | 31.5/27.7 | 34.5/26.2 | 33.5/26.3 | 44.5/27.3 |
| 28.6 | 25.7 | 45.7 | 0 | 13.2/11.7 | 16.8/13 | 18.2/14.4 | 34.5/16.8 |

*In each case the first figure is the dial reading after 1 revolution, the second figure is the dial reading after 10 revolutions.

The formulations containing 41% or more of pigment are clearly thixotropic. Initially no thixotropy was measurable by this method, but after an hour (and possibly shorter times) the system shows time-dependent shear thinning. The thixotropic effect (difference between initial and final reading) becomes more pronounced with increasing time between measurements.

DC Red 21 Lake CI45380:3

| % glycerol | % water | % colour | % IPA | Time 0 | 1 hour | 2 hours | Overnight |
|---|---|---|---|---|---|---|---|
| 39.9 | 39.9 | 16 | 4.3 | | | | Thixotropic? |
| 39.1 | 39.1 | 17.6 | 4.2 | 4.0/3.8 | 6.0/4.0 | 8.0/4.2 | 8.2/4.9 |

The formulations containing 17.6% or more of pigment are clearly thixotropic. Initially no thixotropy was measurable by this method, but after an hour (and possibly shorter times) the system shows time-dependent shear thinning. The thixotropic effect (difference between initial and final reading) becomes more pronounced with increasing time between measurements FD & C Red 40 Lake

| % glycerol | % water | % colour | Time 0 | 1 hour | 2 hours | 6.5 hours | Overnight |
|---|---|---|---|---|---|---|---|
| 37 | 37 | 26 | | | | | Not thixotropic |
| 35.5 | 35.5 | 29 | | | | | Thixotropic? |
| 33.3 | 33.3 | 33.4 | 3.5/1.5 | 4.3/1.3 | 8.5/2.1 | | 9.8/1.5 |

The formulations containing 30% or more of pigment are clearly thixotropic. Initially no thixotropy was measurable by this method, but after an hour (and possibly shorter times) the system shows time-dependent shear thinning. The thixotropic effect (difference between initial and final reading) becomes more pronounced with increasing time between measurements.

Higher Proportions of Water to Glycerol

Dial readings for the formulation containing 14% glycerol/30% Red 40 fell after 1 hour and on further gentle stirring with a laboratory spatula it became very fluid. This shows rheopectic behaviour. However addition of more Red 40 with vigorous agitation produced a system which was thixotropic.

| % glycerol | % water | % colour | Time 0 | 1 hour | 2 hours | 6.5 hours | Overnight |
| --- | --- | --- | --- | --- | --- | --- | --- |
| 14 | 56 | 30.0 | 11.6/4.9 | 4.5/4.3 | | | rheopectic |
| 13.1 | 52.3 | 34.6 | 10.5/11.1 | 27.5/9.0 | | 28/14.6 | |

Formulation Containing Propylene Glycol as an Alternative to Glycerol

| % propylene glycol | % water | % colour | % IPA | Time 0 | 1 hour | 2 hours | Overnight |
| --- | --- | --- | --- | --- | --- | --- | --- |
| 20 | 40 | 40 | 0 | | | | |
| 26 | 37 | 37 | 0 | 1.8/2.0 | 3.6/2.1 | 5.3/2.2 | 6.5/2.3 |

The formulation containing propylene glycol as an alternative to glycerol was thixotropic at 26% D & C Red 40, This is indicative that propylene glycol, or mixtures of glycerol and propylene glycol can be used with the other colours to produce thixotropic dispersions.

Cosmetic Vegetable Carbon Black

| % glycerol | % water | % colour | % IPA | Time 0 | 1 hour | 2 hours | 8 hours | Overnight |
| --- | --- | --- | --- | --- | --- | --- | --- | --- |
| 43.3 | 43.3 | 13.2 | 0.2 | | | | | Not thixotropic |
| 41.2# | 42 | 16 | 0.2 | | | | | |
| 38.4# | 38.4 | 23 | 0.2 | 5.5/3.1 | 4.8/3.5 | 12.2/5.6 | 12.9/4.4 | |

The sample showed rheopexy. High shear caused it to become more viscous, but the dial reading was higher initially at time 0 than the initial reading after 1 hour. However on standing overnight the suspension became thixotropic.

The formulations containing 23% or more of carbon black are thixotropic. Initially no thixotropy was measurable by this method. The thixotropic effect (difference between initial and final reading) becomes more pronounced with increasing time between measurements.

The examples set up shows that thixotropic dispersions of pigments can be produced by adding them to mixtures of water and glycerol or propylene glycol (and very probably mixtures of glycerol and propylene glycol). It is also likely that other water-soluble diols, such as ethylene glycol, could be used with similar effect.

Other pigments which may be used, include D & C Green No 3 Lake, D & C Orange No 4 lake, D & C Orange No 5 aluminium lake, D & C Orange No 5 zirconium lake, D & C Orange No 10 aluminium lake, D & C Orange No 17 lake, D & C Red No 4 aluminium lake, D & C Red No 6 aluminium lake, D & C Red No 6 barium lake, D & C Red No 7 lake, D & C Red No 8 lake, D & C Red No 9 lake, D & C Red No 19 lake, D & C Red No 27 lake, D & C Red No 30 lake, D & C Red No 33 lake, D & C Red No 34 lake, D & C Red No 36 lake, D & C Yellow No 5 lake, D & C Yellow No 6 lake, D & C Yellow No 7 lake, D & C Yellow No 10 lake, FD & C Blue 1 lake, FD & C Red 3 lake, FD & C Red 4 lake, FD & C Yellow 5 lake, FD & C Yellow 6 lake.

Further thixotropic premix compositions have been prepared as follows:

1. 3117 Carmine 6 BN 16 to 20 gram, Glycerine 2 to 3 gram
2. 3158 TP Lithol Rubine BK 16 to 20 gram, Glycerine 2 to 3 gram
3. Carbon black N330 16 to 20 gram, Glycerine 2 to 3 gram
4. Degussa Printex 16 to 20 gram, Glycerine 2 to 3 gram
5. TiO$_2$ Titanium dioxide 16 to 20 gram, Glycerine 2 to 3 gram
6. 1104 Fast Yellow 16 to 20 gram, Glycerine 2 to 3 gram
7. 3157 Vulcan Red LC 16 to 20 gram, Glycerine 2 to 3 gram
8. 1283 permanent Yellow HR 16 to 20 gram, glycerine 2 to 3 gram
9. 4421 Phthalocyanine Blue B pigment 16 to 20 gram, Glycerine 2 to 3 gram
10. 4431 phthalocyanine Blue BS pigment 16 to 20 gram, Glycerine 2 to 3 gram
11. 4311 pigment Sky Blue B 16 to 20 gram, glycerine 2 to 3 gram
12. 5319 fast Green Lake pigment 16 to 20 gram, Glycerine 2 to 3 gram
13. 5406 phthalocyanine Green G pigment 16 to 20 gram, Glycerine 2 to 3 gram
14. 3327 Basic Rhodamine BG Lake pigment 16 to 20 gram, Glycerine 2 to 3 gram
15. 6360 Fast Violet Lake pigment 16 to 20 gram, Glycerine 2 to 3 gram
16. 1646 medium Chrome yellow 16 to 20 gram pigment, Glycerine 2 to 3 gram
17. 570 iron Oxide Green pigment 16 to 20 gram, Glycerine 2 to 3 gram
18. 545 Iron oxide Brown (light) 16 to 20 gram pigment, glycerine 2 to 3 gram These formulations may optionally contain other ingredients. They could contain antimicrobial preservatives such as the parabens, phenoxyethanol, sodium sorbate, sodium benzoate. They may also contain ingredients to enhance stability, dispersion of the pigments and film cohesion and adhesion; for example lecithin and, or polymers. If the particle size of the pigment is smaller, or made smaller by milling or grinding for instance, thixotropy will be achieved at lower concentrations of pigments.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

INDUSTRIAL APPLICABILITY

This invention provides coloured premix chemical compositions which may be widely used in industrial applications to impart colour to products. Such products range from coloured pharmaceutical tablet coatings through coloured plastics materials. It is therefore evident that the invention so-described is capable of industrial application.

Specific Embodiments (a) A thixotropic premix composition comprising a tinctorially effective amount of one or more water insoluble pigments having a particle size of less then about 10 microns, one or more water soluble polyols and water, and optionally, one or more water soluble alcohols, an antifoam, soya lecithin, one or more preservatives, and sufficient acid or alkali so that the premix has a pH in the range of from 4 to 9.

(b) A coloured product which includes a tinctorially effective amount of a thixotropic premix composition which comprises one or more water insoluble pigments having a particle size of less then about 10 microns, one or more water soluble polyols and water, and optionally, one or more water soluble alcohols, an antifoam, soya lecithin, one or more preservatives and sufficient acid or alkali so that the premix has a pH in the range of from 4 to 9.

(c) A Newtonian premix composition comprising a tinctorially effective amount of one or more water soluble pigments, one or more water soluble polyols and water, and optionally, one or more water soluble alcohols, an antifoam, soya lecithin, one or more preservatives and sufficient acid or alkali so that the premix has a pH in the range of from 4 to 9.

(d) A coloured product which includes a tinctorially effective amount of a Newtonian premix composition which comprises one or more water soluble pigments, one or more water soluble polyols and water, and optionally, one or more water soluble alcohols, an antifoam and soya lecithin, one or more preservatives and sufficient acid or alkali so that the premix has a pH in the range of from 4 to 9.

(e) A thixotropic premix composition according to (a) or a coloured product according to (b) wherein the amount of water insoluble pigment included in the premix is in the range of 16 to 20 gram for 4 to 6 gram of water soluble polyol and 50 gram water.

(f) A thixotropic premix composition or a coloured product according to (e) wherein the water soluble polyols are selected from the group consisting of glycerol, propylene glycol and ethylene glycol and mixtures thereof.

(g) A thixotropic premix composition or a coloured product according to (f) wherein the water soluble polyols comprise glycerol and propylene glycol in about equal amounts.

(h) A thixotropic premix composition or a coloured product according to (g) including ethanol or isopropanol.

(i) A thixotropic premix composition or a coloured product according to (h) wherein the amount of ethanol or isopropanol is about 0.5 to 1 gram.

(j) A thixotropic premix composition or a coloured product according to any one of (e) to (i) wherein the alkali is ammonia.

(k) A thixotropic premix composition or a coloured product according to (j) wherein the ammonia is in an amount of about 0.5 gram for 16 to 20 gram of water insoluble pigment.

(l) A thixotropic premix composition or a coloured product according to any one of (e) to (k) including one or more preservatives in an amount up to and including 4 gram for 16-20 gram of water insoluble pigment.

(m) A thixotropic premix composition or a coloured product according to any one of (e) to (l) including soya lecithin in an amount up to and including 4 gram for 16-20 gram of water insoluble pigment.

(n) A thixotropic premix composition or a coloured product according to any one of (e) to (m) including an antifoam in an amount up to and including 4 gram for 16-20 gram of water insoluble pigment.

(o) A Newtonian premix composition according to (c) or a coloured product according to (d) wherein the amount of water soluble pigment included in the premix is in the range of 16-40 gram for 0.8 to 8 gram of water soluble polyol and 50 gram water.

The invention claimed is:

1. A thixotropic premix composition comprising a tinctorially effective amount of one or more water insoluble pigments having a particle size of less than about 10 microns, one or more water soluble polyols and water, one or more water soluble alcohols, an antifoam, soya lecithin, one or more preservatives, and sufficient acid or alkali so that the premix has a pH in the range of from 4 to 9.

2. A thixotropic premix composition according to claim 1 wherein the amount of water insoluble pigment included in the premix is in the range of 16 to 20 grams for 4 to 6 grams of water soluble polyol and 50 gram water.

3. A thixotropic premix composition according to claim 2 wherein the water soluble polyols are selected from the group consisting of glycerol, propylene glycol and ethylene glycol and mixtures thereof.

4. A thixotropic premix composition according to claim 3 wherein the water soluble polyols comprise glycerol and propylene glycol in about equal amounts.

5. A thixotropic premix composition according to claim 4 including ethanol or isopropanol.

6. A thixotropic premix composition according to claim 5 wherein the amount of ethanol or isopropanol is about 0.5 to 1 gram.

7. A thixotropic premix composition according to any one of claims 2 to 6 wherein the alkali is ammonia.

8. A thixotropic premix composition according to claim 7 wherein the ammonia is in an amount of about 0.5 grams for 16 to 20 grams of water insoluble pigment.

9. A thixotropic premix composition according to claim 1 including one or more preservatives in an amount greater than zero and up to and including 4 grams for 16-20 grams of water insoluble pigment.

10. A thixotropic premix composition according to claim 1 including soya lecithin in an amount greater than zero and up to and including 4 grams for 16-20 grams of water insoluble pigment.

11. A thixotropic premix composition according to claim 1 including an antifoam in an amount greater than zero and up to and including 4 grams for 16-20 grams of water insoluble pigment.

12. A coloured product which includes a tinctorially effective amount of a thixotropic premix composition which comprises one or more water insoluble pigments having a particle size of less than about 10 microns, one or more water soluble polyols and water, one or more water soluble alcohols, an antifoam, soya lecithin, one or more preservatives and sufficient acid or alkali so that the premix has a pH in the range of from 4 to 9.

13. A coloured product according to claim 12, wherein the premix includes one or more preservatives in an amount greater than zero and up to and including 4 grams for 16-20 grams of water insoluble pigment.

14. A thixotropic premix composition comprising a tinctorially effective amount of one or more water insoluble pigments having a particle size of less than about 10 microns, water soluble polyols and water, and one or more water soluble alcohols, an antifoam, soya lecithin, one or more preservatives, and sufficient acid or alkali,
   wherein the amount of water insoluble pigment included in the premix is in the range of 16 to 20 grams for 4 to 6 grams of water soluble polyol and 50 grams water, the water soluble polyols comprise glycerol and propylene glycol in about equal amounts.

15. A coloured product which includes a tinctorially effective amount of a thixotropic premix composition which comprises one or more water insoluble pigments having a particle size of less than about 10 microns, water soluble polyols and water, and one or more water soluble alcohols, an antifoam, soya lecithin, one or more preservatives and sufficient acid or alkali,
   wherein the amount of water insoluble pigment included in the premix is in the range of 16 to 20 grams for 4 to 6 grams of water soluble polyol and 50 grams water, the water soluble polyols comprise glycerol and propylene glycol in about equal amounts.

* * * * *